Oct. 24, 1961  W. R. FRANK  3,005,501
DISKS AND DISK IMPLEMENTS
Filed Sept. 10, 1958

*INVENTOR.*
WILLIAM R. FRANK
BY
Roger C. Johnson
*ATTORNEY*

United States Patent Office 3,005,501
Patented Oct. 24, 1961

3,005,501
DISKS AND DISK IMPLEMENTS
William R. Frank, Los Angeles, Calif., assignor to Deere & Company, Moline, Ill., a corporation of Delaware
Filed Sept. 10, 1958, Ser. No. 760,188
1 Claim. (Cl. 172—599)

The present invention relates generally to disk implements and more particularly to disk harrows having a plurality of axially aligned and axially spaced apart ground working disks.

The object and general nature of this invention is a provision of a disk harrow especially adapted for use in disking heavy sticky soil and other conditions where clogging problems are especially severe.

Fairly close disk spacing is frequently desirable, especially to secure uniform tillage, or turning of the soil, but close spacing is a disadvantage when operating under wet, sticky soil conditions, especially if excess trash is present. According to my invention, I have found that by using disks that, instead of being spherical as is common, are conical, substantially all clogging of soil, trash and the like between the disks is substantially eliminated even though the disks are arranged in fairly close spacing.

An additional feature of this invention to provide a disk harrow having closely spaced disks constructed and arranged so that the perpendicular distance between the backside of one disk and the adjacent portion of the next or contiguous disk remains constant from the inner or generally central portion of the disk radially outwardly to the peripheral edges, whereby any material such as soil, trash or the like, may move radially outwardly from between the disks without appreciable restriction.

A further feature of this invention is the provision of a disk harrow having conical disks that are so constructed and arranged that, in operation, soil pressure against the back sides of the disks is substantially uniformly distributed over the conical portions of each disk.

An additional feature of this invention is the provision of an offset disk harrow in which conical disks are employed and in which the cone angle of the disks, that is, the angle between the base of the cone and the conical surface, is greater than the angle between the gang axis in working position and a line perpendicular to the direction of travel. The principal advantage of this construction is that in operation there is an appreciable degree of back pressure on the disks, and by virtue of the conical configuration of the disks this back pressure is distributed over a relative wide area, providing for a lower soil pressure per unit of blade area and resulting in improved stability and depth control.

These and other objects and advantages of the present invention will be apparent to those skilled in the art after a consideration of the following detailed description, taken in conjunction with the accompanying drawings, in which.

Figure 1:
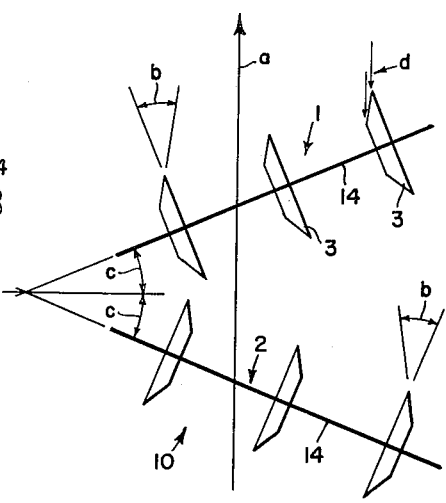
FIG. 1 is a diagrammatic plan view of an offset disk harrow in which the principles of this invention have been incorporated.
Figure 3:
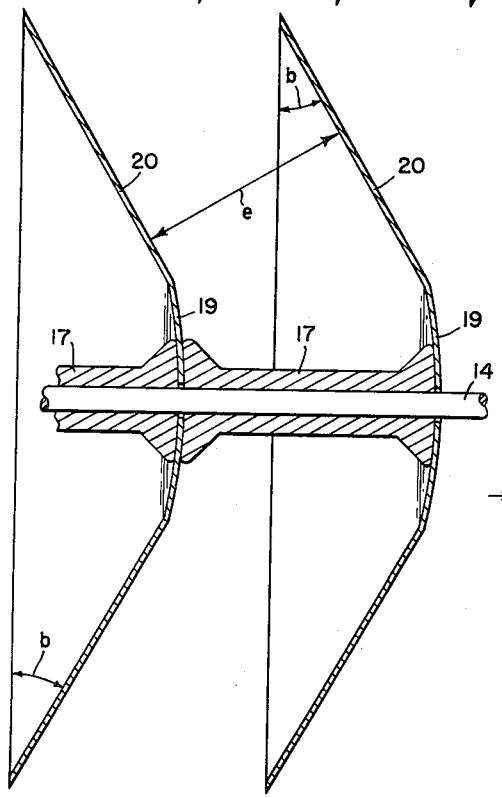
FIG. 3 is a fragmentary sectional view taken through the axis of the gang and showing the novel interrelations between the conical disks, whereby clogging of soil, trash and the like between the disks is substantially eliminated.

Referring first to FIG. 1, the disk gang of the harrow in which the principles of this invention have been incorporated is indicated in its entirety by the reference numeral 10 and comprises a front gang 1 and a rear gang 2, each including a plurality of disks 3 of conical configuration, as best shown in FIG. 3. In FIG. 1 the normal direction of travel is indicated by the arrow $a$ and the cone angle, that is, the angle between the conical portion of each disk and a plane perpendicular to the gang axis, indicated at $b$ in FIGS. 1 and 3, which is in excess of about 26°, is greater than the angle between the axis of each disk gang and a transverse line perpendicular to the direction of forward travel, which latter angle is indicated at $c$ in FIG. 1. As a result of this construction and arrangement, there is an appreciable amount of back pressure against the back side of each disk, which back pressure is indicated by the arrows $d$ in FIG. 1. This back pressure, by virtue of the conical configuration of the disks 3, is distributed over a fairly wide area, much wider than in the case of conventional spherical disks, with the result that the unit soil pressure against the back of the disk is quite low, yet adequate to provide improved stability and depth control in operation. Experience has shown that when the cone angle $b$ of the disks is about 30°, the disk harrow has improved stability, both as to depth and lateral movement, within the normal working range of the harrow. In the normal working range, the angle $c$ may vary from about 20° to 25°.

Figure 2:
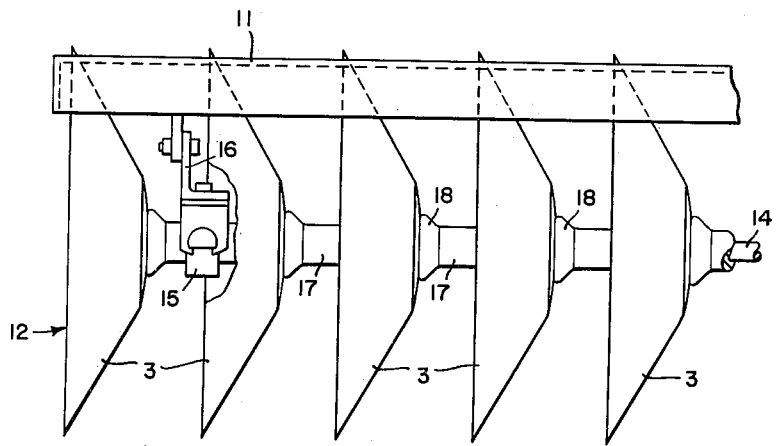
FIG. 2 is a fragmentary rear view of one of the gangs of the disk harrow of FIG. 1.

The particular disk construction will best be seen in FIGS. 2 and 3. Each disk gang includes a frame member 11 of more or less generally conventional construction and a gang 12 of disks arranged in axially spaced apart and axially aligned relation on a gang bolt 14. The spacing between the disks 3 is fairly small, being about 30% of the disk diameter. Each gang 12 is supported for rotation by two or more bearing units 15, each carried by a frame standard 16. The several disks 3 are maintained in spaced apart positions by spools 17 that are apertured to receive the associated gang bolt 14. The spools 17 have generally spherical ends 18 that cooperate with the generally spherical center section 19 of each disk. Radially outwardly from the spherical center section 19, each disk is formed as a conical section, as indicated at 20. The elements making up each conical section lie at an angle to a plane perpendicular the gang axis, the angle being indicated at $b$ and preferably is about 30°, as indicated in FIG. 3. It will be seen from FIG. 1 that elements of each conical disk portion extend substantially exactly parallel to the elements of adjacent disks, and as a result of this arrangement, the perpendicular distance between the backside of one disk and the conical face of the adjacent disk, indicated at $e$ in FIG. 3, is constant from the central portion of the disks radially outwardly to the edge portions thereof.

In operation, the disks are drawn through the soil in the direction of an arrow $a$, and since the cone angle $b$ exceeds the disk gang angle $c$ there is an amount of back pressure $d$ acting against the back sides of the disks and this back pressure is distributed more or less uniformly against conical portions of the back side of the disk. Also, in the disk harrow of this invention, there is little likelihood of soil, trash and the like becoming clogged between adjacent disks, even though the disks are spaced fairly close together, since there is no restriction to outward movement of the accumulation of soil, trash and the like even when operating under heavy or sticky soil conditions, such as may be encountered in rice stubble soil, for example. Moreover, since the soil pressure at the backsides of the disks is distributed generally over the conical sections, there is no concentrated wear on the backside, as there is when employing spherical disks.

While I have shown and described above, the preferred structure in which the principles of the present invention have been incorporated, it is to be understood that my invention is not to be limited to the particular details, shown and described above, but, that, in fact, widely different means may be employed in the practice of the broader aspects of my invention.

What I claim, therefore, and desire to secure by Letters Patent is:

A disk implement comprising frame means adapted to be propelled along a normally forward direction of travel, a gang of disks carried thereby in axially aligned spaced apart relation, the axis of said gang being disposed generally diagonally at an angle relative to a line perpendicular to the direction of forward travel, each of said disks having a radially outer conical section that extends generally radially from the center portion of the disk at an angle to a plane perpendicular to the gang axis that is greater than the angle between the gang axis and a line perpendicular to the direction of forward travel, whereby in operation soil pressure due to forward movement of the gang is imposed against the back side of each disk generally uniformly across the back of the disk.

References Cited in the file of this patent
UNITED STATES PATENTS

| | | |
|---|---|---|
| 19,489 | Coe | Mar. 2, 1858 |
| 471,209 | Cordes | Mar. 22, 1892 |
| 2,164,210 | Johnson | June 27, 1939 |
| 2,555,441 | Hackney | June 5, 1951 |

FOREIGN PATENTS

| | | |
|---|---|---|
| 81,324 | Denmark | June 25, 1956 |